(12) United States Patent
Glimpel et al.

(10) Patent No.: US 6,514,148 B2
(45) Date of Patent: Feb. 4, 2003

(54) THREAD ROLLING TAP

(75) Inventors: Helmut Glimpel, Lauf (DE); Dietmar Maier, Lauf (DE); Dietmar Liebau, Pommelsbrunn (DE); Rainer Fritsch, Aachen (DE)

(73) Assignee: EMUGE-Werk Richard Glimpel Fabrik für Präzisionswerkzeuge vormals Moschkau & Glimpel, Lauf (DE)

(*) Notice: Subject to any disclaimer, the term of this patent is extended or adjusted under 35 U.S.C. 154(b) by 0 days.

(21) Appl. No.: 09/730,252

(22) Filed: Dec. 5, 2000

(65) Prior Publication Data

US 2001/0014625 A1 Aug. 16, 2001

(30) Foreign Application Priority Data

Dec. 7, 1999 (DE) .......................................... 199 58 827

(51) Int. Cl.⁷ ................................................. B21J 13/02
(52) U.S. Cl. ....................................... 470/204; 470/198
(58) Field of Search ................................ 470/198, 204; 408/217, 218, 219, 220, 221

(56) References Cited

U.S. PATENT DOCUMENTS

| | | | |
|---|---|---|---|
| 3,295,154 A | | 1/1967 | Watson |
| 3,661,471 A | * | 5/1972 | Simonffy ..................... 408/220 |
| 3,775,792 A | * | 12/1973 | Leonard ..................... 470/204 |
| 3,802,015 A | * | 4/1974 | Chase et al. ................. 470/204 |
| 4,074,950 A | * | 2/1978 | Holmes ....................... 408/220 |
| 4,396,321 A | * | 8/1983 | Holmes ....................... 408/217 |

FOREIGN PATENT DOCUMENTS

| | | |
|---|---|---|
| DE | 7807787 | 7/1978 |
| DE | 3107910 | 9/1982 |
| DE | 9603957 | 8/1997 |
| EP | 0004089 | 9/1979 |
| FR | 0628184 | 10/1927 |
| GB | 1584771 | 12/1981 |

* cited by examiner

*Primary Examiner*—Ed Tolan
(74) *Attorney, Agent, or Firm*—Sidley Austin Brown & Wood, LLP

(57) ABSTRACT

A thread rolling tap including a stem portion, and a thread forming portion having a body with a plurality of thread turns formed on the body and including a front entrance region and a guide region, with the thread turns having each, in the front region in vicinity of the body, inclined pressure flanks forming side surfaces of an acute angle and connected by an outer, arranged radially outwardly with respect to the body, pressure surface formed as a flattening having opposite rounded edges extending along a circumference of a respective thread turn.

7 Claims, 5 Drawing Sheets

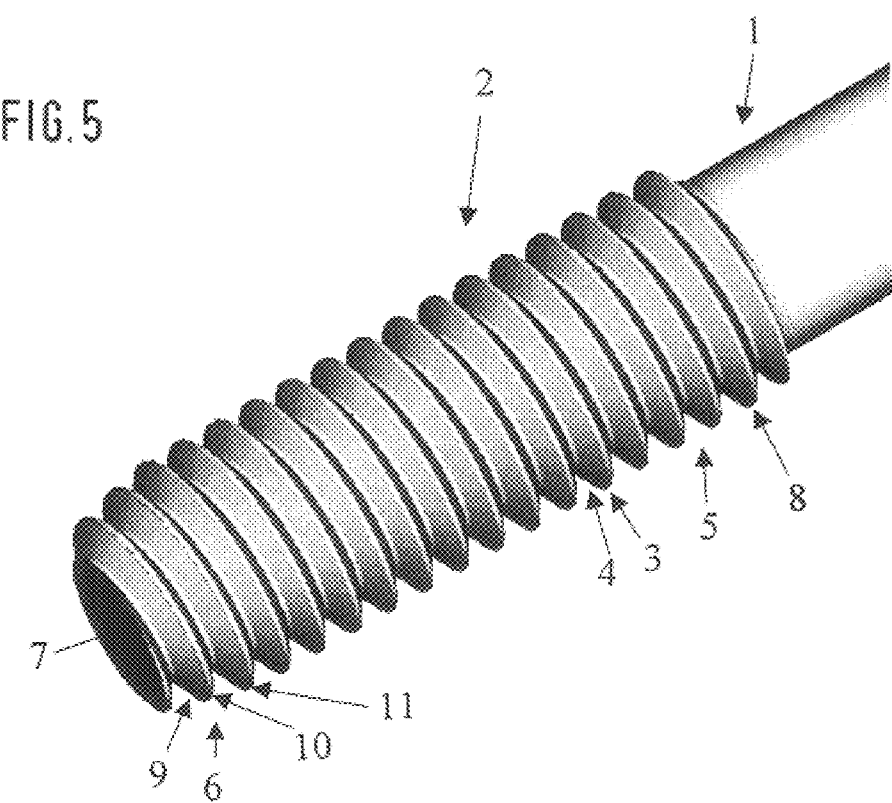
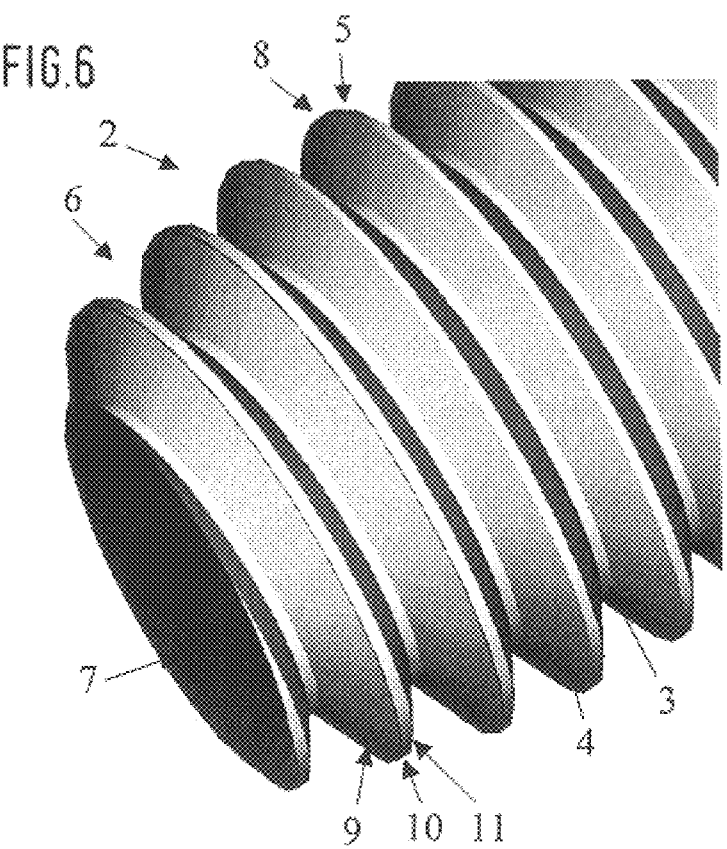

THREAD ROLLING TAP

BACKGROUND OF THE INVENTION

1. Field of the Invention

The present invention relates to a thread rolling tap including a shank, and a thread forming portion having a body with a plurality of thread turns formed on the body and including a front entrance region and a guide region, with the thread turns having each, in the front region in vicinity of the body, inclined pressure flanks forming side surfaces of an acute angle and connected by an outer, arranged radially outwardly with respect to the body, pressure surface.

2. Description of the Prior Act

The tread rolling taps of the type described above are used for forming an inner thread in an object without cutting the object. As a rule, the shank is formed as a cylinder and serves for securing the tap in a tool. The shank is received in the tool chuck and has a square end for transmitting a torque to the tap. The guide region also serves for calibration of the produced inner thread. The thread forming portion is subjected to a surface treatment, e.g., in order to obtain a wear-resistant surface of the top thread-forming portion. During the rolling of the thread, a stepwise cold deformation takes place with calibration and dressing of the thread flanks. The thread turns of the tool have a polygonal cross-section.

German Utility Model DE 18 47 255U discloses a thread rolling tap of the type described above in which the outer pressure surface of the front entrance region is formed by thread turns the cross-section of which, when viewed radially outwardly, represents a substantially acute angle, i.e., the thread turns are formed by the outer inclined pressure flanks formed as a continuation of the inner inclined pressure flanks. The operational direction forms with the axial extent and the radial extent of the tap an angle. The increase of the penetration of a thread turn in the front region is determined by so-called chasing, i.e., by an increase of the body diameter from the free end of the tap toward the guide region, with the height of the thread turns remaining the same. When an inner thread is formed with the known tap in a material having a hexagonal lattice structure, the produced inner thread would have the following negative characteristics, namely, the inner diameter is not completely formed. In the region of the inner diameter, loose material particle remain. The use of the known tap for producing inner threads in a material with small number of slip surfaces and a small deformability during cold forming, should be avoided, at least for obtaining a high-stressed threaded connections which, among others, are usually found in the automobile industry.

Accordingly, an object of the present invention is to provide a thread rolling tap of a type described above with which, during the formation of an inner thread in a material having a hexagonal lattice structure, an inner thread with an improved inner diameter is produced, without presence of material particles in the region of the inner diameter.

Another object of the present invention is to provide a thread rolling tap of the type described above with the use of which a stress concentration in a threaded connection is prevented.

SUMMARY OF THE INVENTION

These and other objects of the present invention, which will become apparent hereinafter, are achieved by providing, according to the present invention, an outer surface which is formed as a flattening having opposite rounded edges extending along a circumference of a respective thread turn.

The thread rolling tap according to the present invention permits to produce an inner thread in a material having a hexagonal lattice structure, with an adequately formed inner diameter and without presence of loose material particles in the inner diameter region. The penetration of the wide or large flat pressure surfaces or working surfaces into the material generates friction. The resulting heat and pressure improve the deformability of the material and cause displacement of the material (sliding) along the lattice planes specific for the material. The distortion of the crystal structure of the material during the formation of the inner thread with the inventive tap, e.g., as a result of stress concentration, was not detected. The thread rolling tap according to the present invention is particular suitable for materials which, as a result of their hexagonal lattice structure, have a small number of slip surface and/or small deformability. The elimination of sharp edges according to the present invention permitted to achieve the desired effect. The radius of the edge rounding, e.g., can constitute 0.1 mm.

The contemplated wide flat outer surfaces, which are provided in the thread rolling tap according to the present invention, differ from edge roundings, which are provided on the thread turns also in the front region in conventional taps in order to eliminate sharp edges on the free radial ends of the thread turns. The outer surface flattenings are substantially wider than the conventional edge roundings proved in the guide region. The flattenings have a width of a minimum of one-tenth of the thread pitch (P/10). The widened flattenings produce in the material such compressive strains that two or more slide planes are formed in the material having a suitable lattice structure. The thread is formed primarily as a result of pressure, so that the temperature of the material remains under 250° C. even under 200° C.

According to a particularly preferred and advantageous embodiment of the present invention, the flattening width remains the same from one thread turn to another thread turn. This embodiment of an inventive tap is used when the front region is chased. The important thing is the provision of widened pressure surface flattenings which cause friction and, thereby, the heating of the material.

According to a further preferred and advantageous embodiment of the present invention, the width of the flattenings of the thread turns diminishes, in an axial direction toward the guide region, to a minimum. This embodiment of the invention tap is primarily used when the tap body has the same diameter up to the front free end. The reduction of the width of the flattenings corresponds to the increase of the radial dimension of the thread turns in the direction from the front end to the guide region.

In the thread rolling tap according to the present invention, the radii of the pressure surface flattenings increases in the direction from the front end to the guide region from a thread turn to a thread turn which increases the effect of the thread turns of the front region. The width of the pressure surface flattenings in the axial direction from the front end to the guide region, as discussed above, decreases in the tap according to the second embodiment. The minimum width is obtained when the thread turn in the guide region reaches the minimum of a constructively obtainable tool outer diameter. The minimum width can correspond to a very small rounding of the thread turns in the guide region when their radially outwardly edges are rounded. The flattenings are provided, generally, as a rule maximum on three thread turns.

According to another embodiment of the present invention, the width of the flattenings is continuously reduced from a thread turn to a thread turn. The flattenings provide for a favorable deformation of the material and inclined, when viewed in the axial direction, toward the tap central axis.

The thread rolling tap according to the present invention is particularly suitable for forming inner threads in materials having a hexagonal lattice structure and having one or more, e.g., two slide surfaces. To materials with only one slide surface relate, e.g., Mg, Zn, and Be.

The thread rolling tap according to the present invention is also particularly suitable for forming inner thread in materials having a hexagonal lattice structure and chips of which, during machining reach a temperature up to 500° C. To these materials relate primarily magnesium and magnesium alloys. The inventive tap permits to obtain a more precise inner thread in the magnesium and magnesium alloys.

The thread rolling tap according to the present invention is not used for forming inner threads in steel but is used primarily for forming inner threads, as it has already been discussed above, in materials having a hexagonal lattice structure and the chip material of which burns during the treatment of the material. As a rule, the thread forming portion, in particular the front region, is provided with a wear-resistant layer that covers at least the flattenings and their rounded edges. A method of forming inner threads in magnesium is contemplated with which the material is not heated, directly or indirectly, but the thread is formed only by application of pressure.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS:

The drawings show:

FIG. 5 a perspective view of a third embodiment of a thread rolling tap according to the present invention;

FIG. 6 a perspective view, at an increased scale in comparison with that of FIG. 5, of a front region of the tap shown in FIG. 5;

DETAILED DESCRIPTION OF THE PREFERRED EMBODIMENTS

Figure 1:
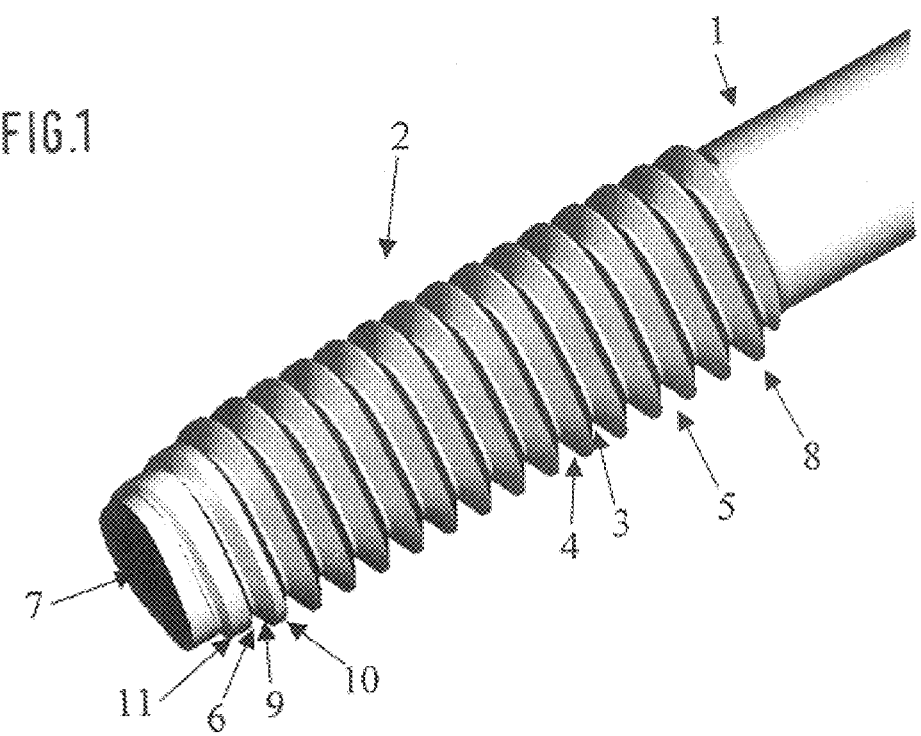
FIG. 1 a perspective view of a first embodiment of a thread rolling tap according to the present invention.
Figure 2:
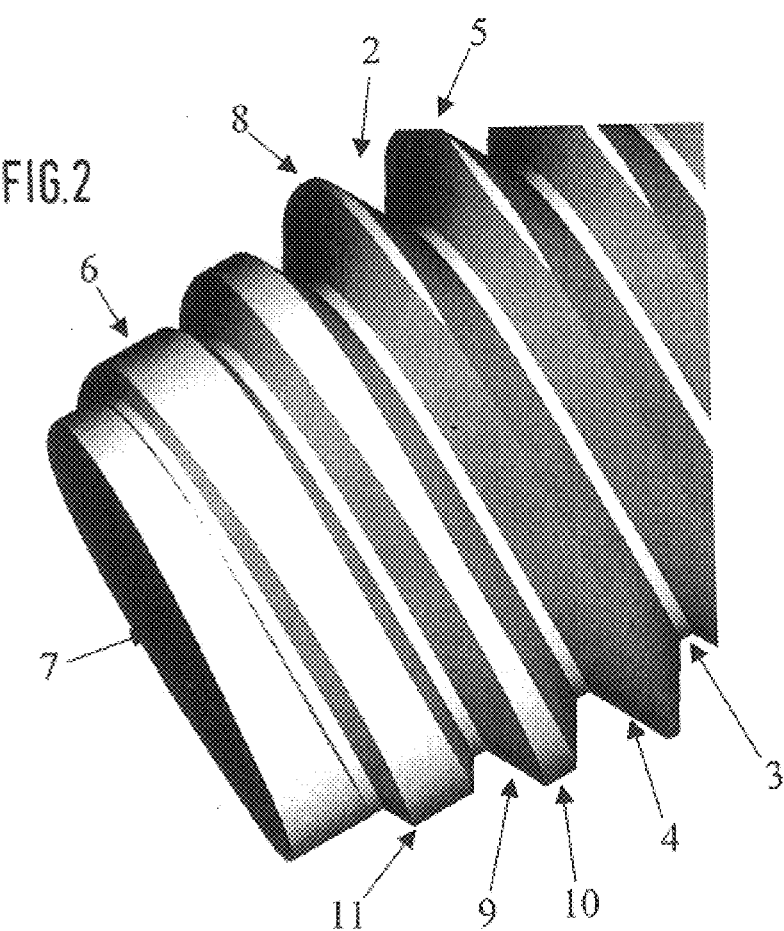
FIG. 2 a perspective view, at an increased scale in comparison with that of FIG. 1, of a front region of the tap shown in FIG. 1.
Figure 3:
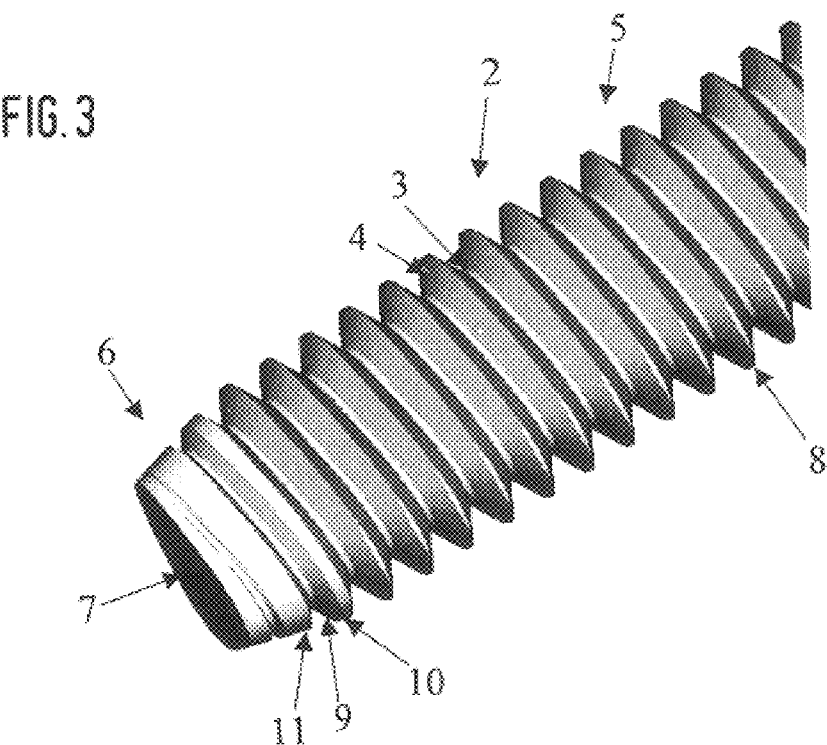
FIG. 3 a perspective view of a second embodiment of a thread rolling tap according to the present invention.
Figure 4:
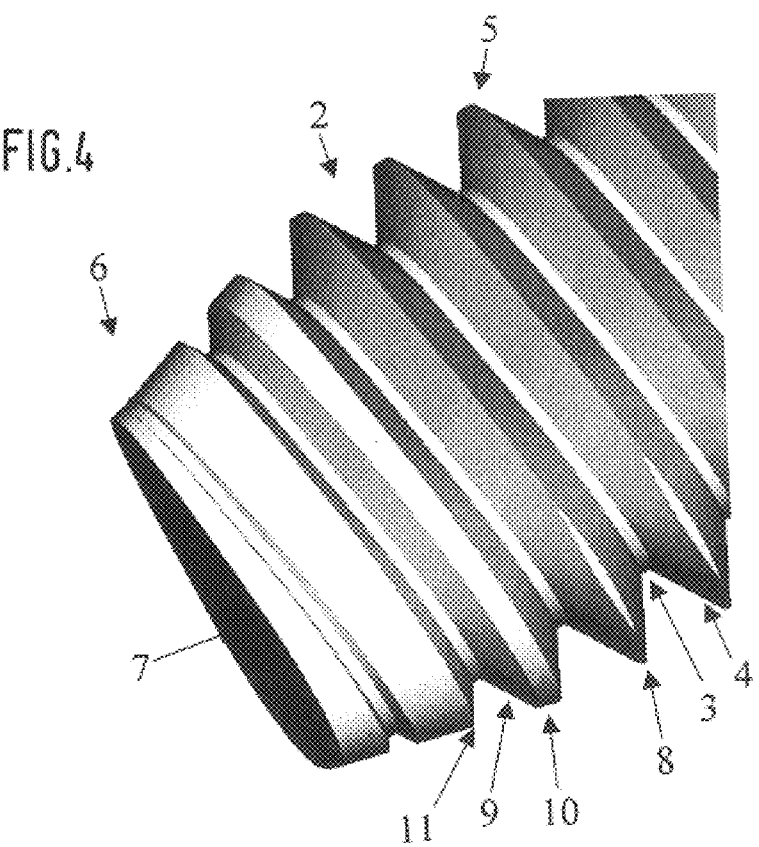
FIG. 4 a perspective view, at an increased scale in comparison with that of FIG. 3, of a front region of the tap shown in FIG. 3.

A thread rolling tap according to the present invention, which is shown in the figures, has a shank 1 and a thread forming portion 2. The thread forming portion 2 has a body 3 on which thread turns 4 are provided. The thread forming portion 2 includes a guide region 5 and a front region 6 having a free runout thread end 7. The thread turns 4 form, in the guide region 5, an acute angle with, e.g., rounded edges 8. In the front region 6, the screw thread turns 4 form each, in the vicinity of the body 3, inner inclined pressure flanks 9 and a radial outer pressure surface flattening 10. Each surface flattening 10 is limited by two circumferential edges 11 (FIGS. 19–20) which are rounded.

Figure 19:
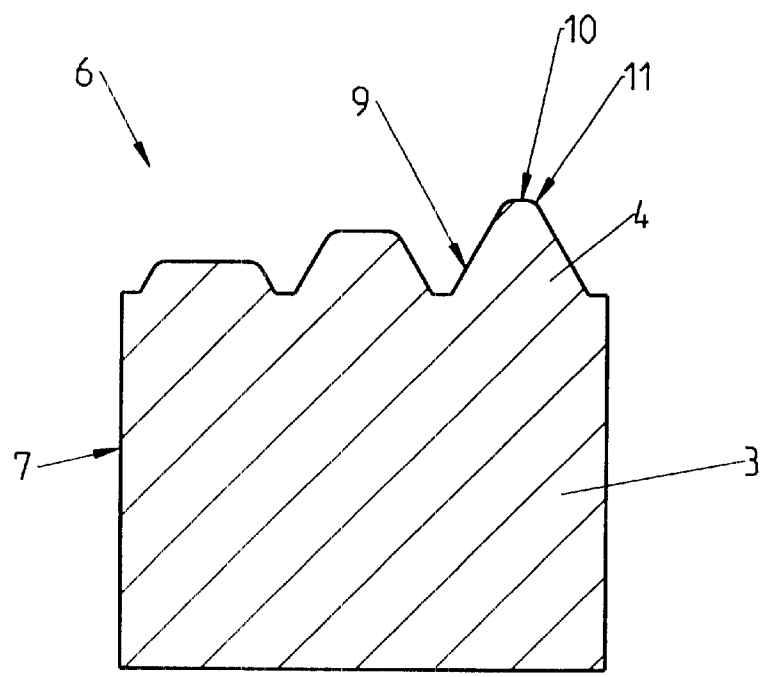
FIG. 19 a cross-sectional view of the tap front region shown in FIG. 2 at an increased scale in comparison with that of FIG. 2.

In the tap shown in FIGS. 1–2 and 7–8, the cross-section of the thread forming portion 4 is a polygon (profile tap relief) with stepped ever raising surface flattenings 10 (see FIG. 19). The body 3 has, up to the front end, a constant cross-section.

Figure 20:
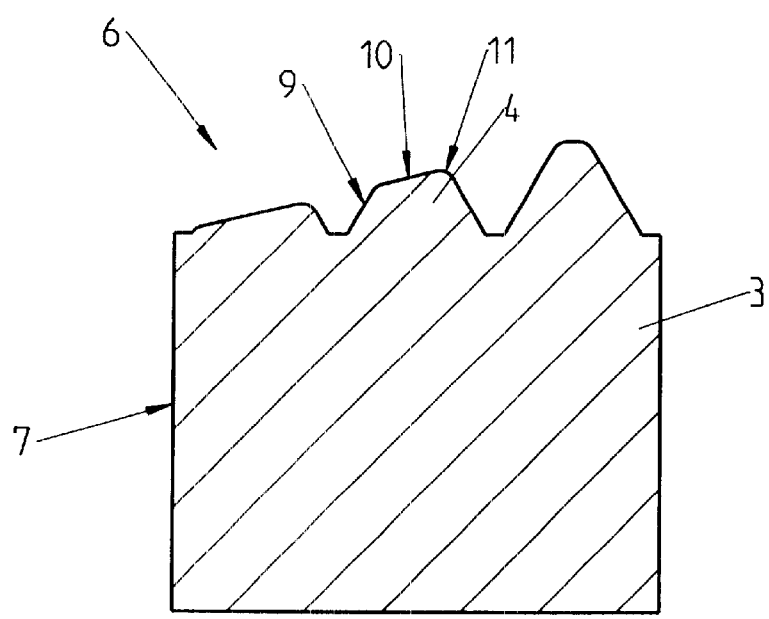
FIG. 20 a cross-sectional view of the tap front region shown in FIG. 4 at an increased scale in comparison with that of FIG. 4.

In the tap shown in FIGS. 3–4 and 9–10, the cross-section of the thread forming portion is also a polygon with conically-shaped or continuously raised surface flattenings 10, as shown in FIG. 20. As in the embodiment of FIGS. 1–2, 7–8, the body 3 has, up to the front end, a constant cross-section.

In the tap shown in FIGS. 5–6 and 11–12, the thread forming portion has a circular cross-section with the same width of all the flattenings, with the body 3 having a chase cross-section diminishing toward the free end.

Figure 13:
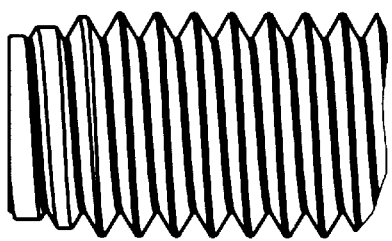
FIG. 13 a side view of a fourth embodiment of a tap according to the present invention.
Figure 14:
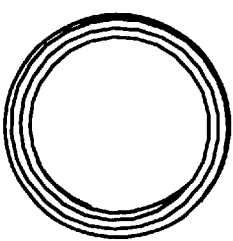
FIG. 14 a left-side view of the fourth embodiment of a tap according to the present invention.
Figure 11:
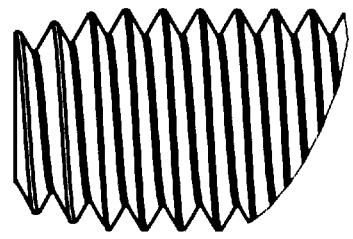
FIG. 11 a side view of the tap shown in FIG. 5.
Figure 12:
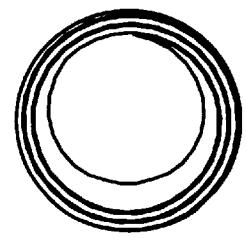
FIG. 12 a left-side view of the tap shown in FIG. 5.
Figure 9:
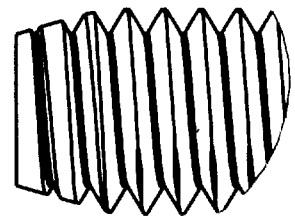
FIG. 9 a side view of the tap shown in FIG. 3.
Figure 10:
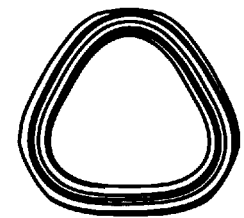
FIG. 10 a left-side view of the tap shown in FIG. 3.
Figure 7:
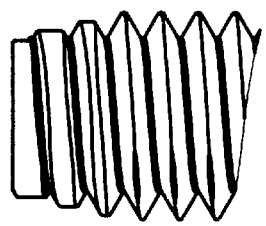
FIG. 7 a side view of the tap shown in FIG. 1.
Figure 8:
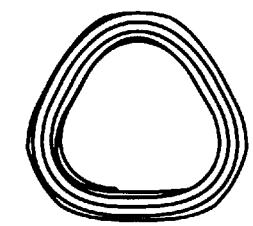
FIG. 8 a left-side view of the tap shown in FIG. 1.

In the tap shown in FIGS. 13–14, the thread forming portion has a circular cross-section and a stepped raise of the surface flattenings, in the same manner as shown in FIG. 19. The body 3 in the tap shown in FIGS. 13–14 has, up to the free end, a constant cross-section.

Figure 15:
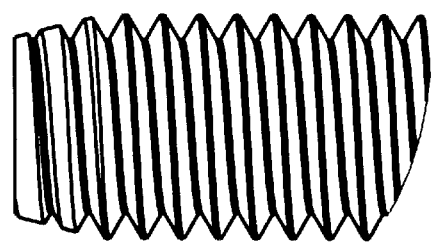
FIG. 15 a side view of a fifth embodiment of a tap according to the present invention.
Figure 16:
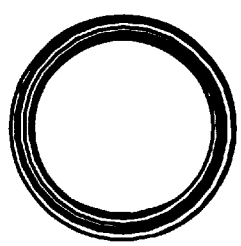
FIG. 16 a left-side view of the fifth embodiment of a tap according to the present invention.

In the tap shown in FIGS. 15–16, the thread forming portion has a circular cross-section with conical or constantly raising the surface flattenings, in the same manner as shown in FIG. 20. The body 3 has, up to the free end, a constant cross-section.

Figure 17:
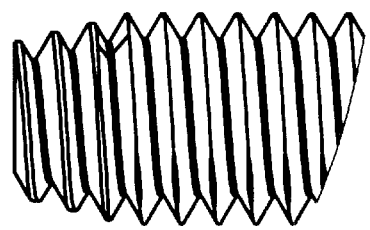
FIG. 17 a side view of a sixth embodiment of a tap according to the present invention.
Figure 18:
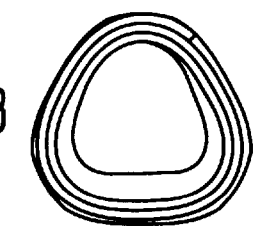
FIG. 18 a left-side view of the sixth embodiment of a tap according to the present invention.

In the tap shown in FIGS. 17–18, the thread forming portion has a polygonal cross-section with the same width of the surface flattenings. The body 3 in the tap shown in FIGS. 17–18 has a chase cross-section diminishing toward the free front end.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A thread rolling tap, comprising a shank; and a thread forming portion having a body with a plurality of thread turns formed on the body and including a front entrance region and a guide region, wherein the thread turns have each, in the front region in vicinity of the body, inclined pressure flanks forming side sections of an acute angle and connected by an outer, arranged radially outwardly with respect to the body, pressure surface formed as a flattening having opposite rounded edges extending along a circumference of a respective thread turn.

2. A thread rolling tap as set forth in claim 1, wherein the flattenings have a same width for all of the thread turns.

3. A thread rolling tap as set forth in claim 1, wherein a width of the flattenings of the thread turns diminishes, in an axial direction toward the guide region, to a minimum.

4. A thread rolling tap as set forth in claim 3, wherein the widths of the flattenings continuously diminish from a thread turn to a thread turn.

5. A thread rolling tap as set forth in claim 1, wherein a width of the flattening of each thread turn is greater than one-tenth of a thread pitch, and a radius of a rounded edge is equal about 0.1 mm.

6. A method of forming an inner thread in a material having a hexagonal lattice structure and forming, with an increased in temperature, at least one slip plane, the method comprising the steps of:

providing a thread rolling tap including a stem portion, and a thread forming portion having a body with a plurality of thread turns formed on the body and including a front entrance region and a guide region, wherein the thread turns have each, in the front region in vicinity of the body, inclined pressure flanks forming side surfaces of an acute angle and connected by an outer, arranged radially outwardly with respect to the body, pressure surface formed as a flattening having a width of at least one-tenth of a thread pitch (P/10) and having opposite rounded edges extending along a circumference of a respective thread turn and having a radius of an edge rounding of 0.1 mm; and form the inner thread.

7. A method of forming an inner thread in a material having a hexagonal lattice structure and chips which, during machining, reach a temperature up to about 500° C., the method comprising the steps of:

providing a thread rolling tap including a stem portion, and a thread forming portion having a body with a plurality of thread turns formed on the body and including a front entrance region and a guide region, wherein the turns have each, in the front region in vicinity of the body, inclined pressure flanks forming side surfaces of an acute and connected by an outer, arranged radially outwardly with respect to the body, pressure surface formed as a flattening having opposite rounded edges extending along a circumference of a respective thread turn, with the flatting and the opposite rounded edges being covered by a wear resistant layer, and forming the inner thread.

* * * * *